United States Patent [19]

Nakamura et al.

[11] Patent Number: 4,503,366
[45] Date of Patent: Mar. 5, 1985

[54] INDIVIDUAL DEFLECTION CONTROL SIGNALS FOR PLURAL PICKUP-TUBES IN A TELEVISION CAMERA

[75] Inventors: Takashi Nakamura, Hadano; Yoshihiro Morioka, Atsugi, both of Japan

[73] Assignee: Sony Corporation, Tokyo, Japan

[21] Appl. No.: 282,263

[22] Filed: Jul. 10, 1981

[30] Foreign Application Priority Data

Jul. 11, 1980 [JP] Japan .................................. 55-95479

[51] Int. Cl.³ .......................... H01J 29/56; H04N 9/09
[52] U.S. Cl. ........................................ 315/370; 358/51
[58] Field of Search .................... 315/370, 371; 358/51

[56] References Cited

U.S. PATENT DOCUMENTS 4,051,512  9/1977  van Roosmalen ..................... 358/51

FOREIGN PATENT DOCUMENTS 1239340  7/1971  United Kingdom .
1353147  5/1974  United Kingdom .
1375645  11/1974  United Kingdom .
1386532  3/1975  United Kingdom .

*Primary Examiner*—Theodore M. Blum
*Assistant Examiner*—Gregory C. Issing
*Attorney, Agent, or Firm*—Lewis H. Eslinger; Alvin Sinderbrand

[57] ABSTRACT

Deflection control signals are supplied to respective horizontal and vertical deflecting plates in a plural pickup-tube color television camera. A predetermined one pickup-tube is supplied with the horizontal and vertical deflecting signals that are generated by a suitable source. These signals also are supplied to a compensating voltage generator which is selectively operative to produce respective horizontal deflection compensating voltages for each of the remaining pick-up tubes and respective vertical deflection compensating voltages for such remaining tubes. A horizontal combining circuit is provided for each of the remaining tubes and a vertical combining circuit also is provided for each of these remaining tubes. Each combining circuit is supplied with a respective horizontal or vertical deflection signal from the source and also with a respective horizontal or vertical deflection compensating voltage generated by the compensating voltage generating circuit, and is operative to generate an adjusted horizontal or vertical deflection signal which is applied to the horizontal or vertical deflecting plates of its associated pickup-tube.

25 Claims, 3 Drawing Figures

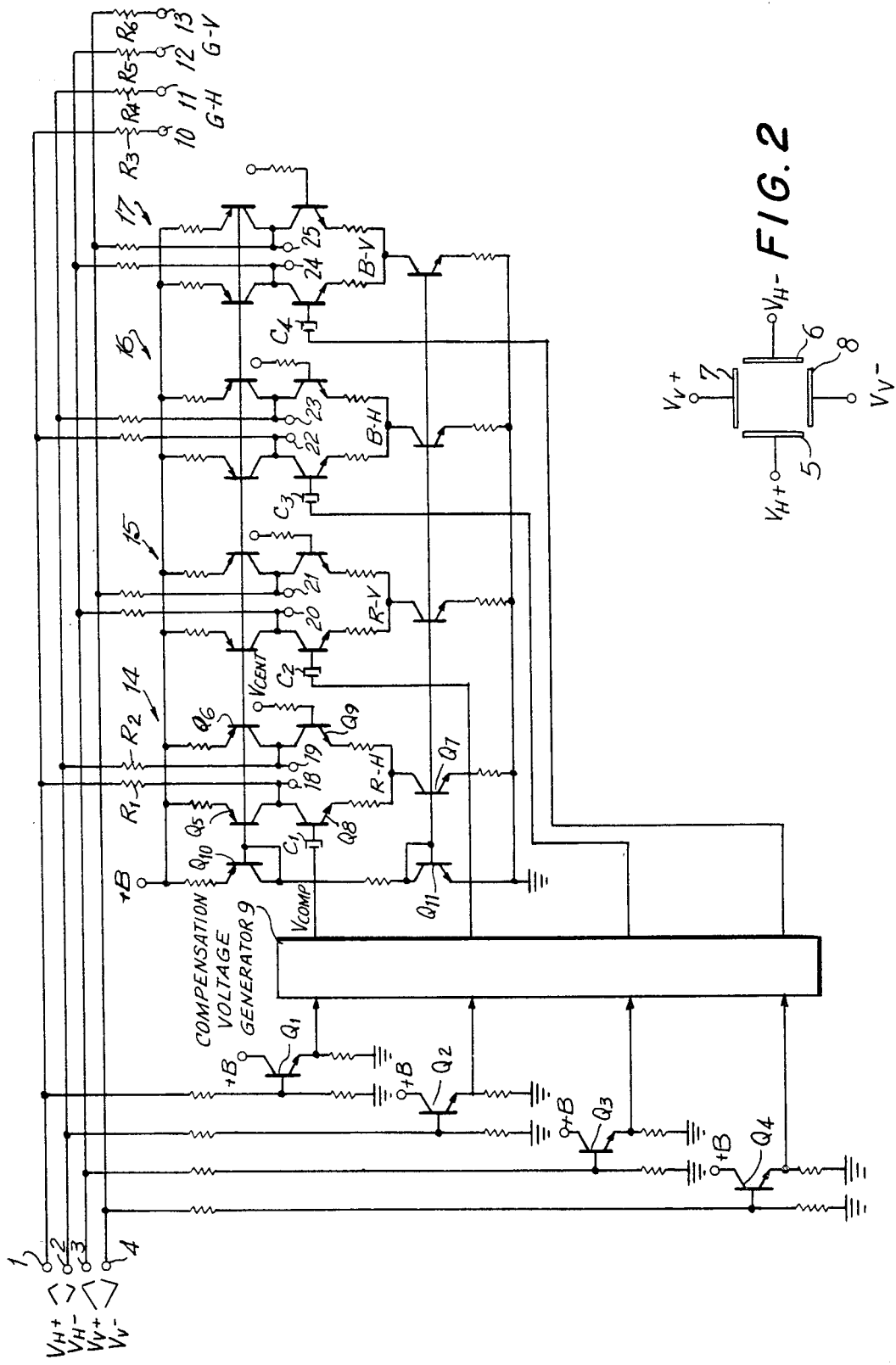

INDIVIDUAL DEFLECTION CONTROL SIGNALS FOR PLURAL PICKUP-TUBES IN A TELEVISION CAMERA

BACKGROUND OF THE INVENTION

This invention relates to apparatus for generating deflection control signals to be supplied to the horizontal and vertical deflecting plates of a plural pickup-tube television camera and, more particularly, to such apparatus wherein the deflection signals supplied to a respective set of plates may be adjusted substantially independently of the remaining deflection signals. The present invention is particularly advantageous in a color television camera of the type having, for example, red, green and blue pickup-tubes, wherein the deflection of the electron beam in a particular tube may be adjusted substantially independently of the adjustment of the deflection of the electron beam in either of the remaining tubes.

In a typical pickup-tube of a television camera, a target, such as a target formed of photoconductive material, is scanned by an electron beam which forms a raster thereon. The raster generally is of a smaller dimension than that of the target and, for purposes of the present discussion, is referred to as a "frame". The horizontal and longitudinal dimensions of this frame are determined by the horizontal and vertical deflections of the electron beam. In a so-called one-tube camera, such as a monochrome or black-and-white television camera, a single electron beam scans a single raster, or frame, on the target. It is conventional to provide manually operative controls to enable the operator of the camera to effect various adjustments in the characteristics of the frame such as, for example, a centering adjustment which serves to move the geometric center of the frame to a desired location on the target, a size adjustment which serves to change the horizontal and/or vertical dimension of the frame, thus changing its size, a skew or rotation adjustment which serves to rotate the frame about its center portion, and the like. Typically, these adjustments may be effected by the operator to compensate for changes in the operating characteristics of the electronic circuitry due to, for example, temperature, age, and the like. Also, in the event of mechanical changes which might occur, or variations in electrical and mechanical alignment, the capability of such adjustments is desirable.

In some television camera tubes, electromagnetic deflection apparatus is provided for controlling the horizontal and vertical deflection of the beam. The aforementioned adjustments may be achieved by mechanically changing the relative positions of, for example, the deflecting coils. It is difficult to attain precise adjustments in the frame, or raster, merely by relying on mechanical means.

Other television cameras utilize electrostatic deflection plates to achieve the horizontal and vertical deflections of the electron beam. Adjustments in the frame, or raster, in such tubes generally are attained by modifying the deflection voltages which are supplied to the electrostatic deflection plates. For example, the usual horizontal and vertical sawtooth deflection voltage waveforms have adjustment voltages superimposed thereon. While such electronic techniques provide satisfactory adjustments in the raster, difficulties arise when this technique is used in a color television camera of the type having a plurality of pickup-tubes, such as a three-tube (red, green, blue) camera.

In the three-tube color camera, separate deflection apparatus is provided for the respective tubes. For example, a set of horizontal and vertical deflection devices is provided for the red tube, another set of horizontal and vertical deflection devices is provided for the green tube, and a third set of horizontal and vertical deflection devices is provided for the blue tube. A common source generates the sawtooth deflection voltages for all of the horizontal deflection devices, and a common source generates the sawtooth deflection voltages for all of the vertical deflection devices. If adjustments in the rasters are needed, it is not unusual to adjust the sawtooth voltage waveforms generated by the horizontal and vertical deflection voltage sources, such that the same adjusted deflection voltage is applied to all of the horizontal deflection devices and, likewise, the same adjusted vertical deflection voltage is applied to all of the vertical deflection devices.

However, when electrostatic deflection plates are used in such a three-tube color camera, it is possible that mechanical variations may exist between, for example, the deflection plates associated with the red tube and the deflection plates associated with the green or blue tube. As one example thereof, the deflection plates associated with one tube may be larger or smaller than the corresponding deflection plates associated with one or both of the other tubes. As another example, the relative position of the deflection plates associated with one tube may differ from the relative position of the deflection plates associated with one or the other of the remaining tubes. As a result of such mechanical differences between the deflection plates of the various tubes, the raster scanned by, for example, the red tube may differ in size, location or position on the target, relative to the raster scanned by the green and/or blue tubes. This variation in the "red" raster may be adjusted by superimposing the aforementioned adjustment voltages on the horizontal and/or vertical deflection voltages. However, since the same horizontal and vertical deflection voltages are supplied to the horizontal and vertical deflection plates, respectively, of all of the tubes, a correction in the "red" raster may result in an undesired change or distortion, in the "green" and/or "blue" rasters. Because the deflections of the red, green and blue beams cannot be adjusted independently of each other, a proper adjustment in one may deleteriously affect the raster scanned by the others. As a result, distortion, interference, and noise may appear in the color television picture which ultimately is reproduced from the video signals derived from the color camera.

OBJECTS OF THE INVENTION

Therefore, it is an object of the present invention to provide improved color television camera control apparatus for enabling independent adjustments in the deflections of the respective electron beams in a plural pickup-tube television camera.

Another object of this invention is to provide deflection adjustment apparatus for use in a plural pickup-tube television camera which overcomes the aforenoted disadvantages.

A further object of this invention is to provide deflection adjustment control in a color television camera wherein the raster scanned by each individual electron beam may be adjusted substantially independently of the remaining rasters.

An additional object of this invention is to provide improved apparatus for enabling selective adjustment in the horizontal and vertical deflections of each electron beam in a three-tube television camera, whereby an adjustment in the deflection of one beam is not accompanied by an undesired adjustment in the deflection of any other beam.

Yet another object of this invention is to provide improved deflection adjustment apparatus for use in a color television camera of the type having a respective set of deflection plates for each tube.

A still further object of this invention is to provide electronic controls for selectively and independently adjusting the raster scanned by each of red, green and blue beams in a color television camera.

Various other objects, advantages and features of the present invention will become readily apparent from the ensuing detailed description.

SUMMARY OF THE INVENTION

In accordance with this invention, apparatus is provided for adjusting the horizontal and vertical deflection signals supplied to the horizontal and vertical deflection devices associated with each tube in a plural pickup-tube television camera. A common source generates the horizontal and vertical deflecting signals for the horizontal and vertical deflection devices, respectively, associated with all of the pickup-tubes. These horizontal and vertical deflecting signals are supplied, substantially as is, to the respective horizontal and vertical deflecting devices of a predetermined pickup-tube. A compensating voltage generator produces respective horizontal and vertical deflection compensating voltages for each of the remaining tubes of the camera; and these compensating voltages are combined with the horizontal and vertical deflecting signals supplied from the common source to generate adjusted horizontal and vertical deflection signals which are applied to the horizontal and vertical deflecting devices of the remaining pickup-tubes. In one embodiment, the deflecting devices are formed of deflection plates, and the television camera is a color camera having red, green and blue pickup-tubes. In such a color camera, it is preferable to supply the horizontal and vertical deflecting signals from the source, substantially as is, to the horizontal and vertical deflection plates of the green tube. Red and blue compensating voltages are generated and used to adjust the red and blue horizontal and vertical deflecting signals, respectively. Such deflection compensating voltages are produced substantially independently of each other, such that the raster scanned by one beam may be adjusted substantially independently of the raster scanned by the other beams. Consequently, mechanical differences, variations in the operating characteristics of the various deflection circuits, and the like, which may cause differences or changes in the respective rasters, may be compensated.

In accordance with one aspect of this invention, the deflection compensating voltage produced, for example, for the horizontal deflection of the red beam, is combined in a differential amplifier with the horizontal deflecting signals generated from the source. The differential amplifier functions to modify the horizontal deflecting signals to produce the aforementioned adjusted horizontal deflection signals which are applied to the horizontal deflecting plates of the red tube. Likewise, similar differential amplifiers are used to generate the adjusted horizontal deflection signal for the blue tube, as well as to generate the adjusted vertical deflection signals for the red and blue tubes. Preferably, such differential amplifiers may be omitted for adjusting the deflecting signals supplied to the green tube; but, if desired, the green tube also may be provided with the aforementioned means for independently adjusting the raster scanned therein. That is, although two of the three tubes preferably are provided with differential amplifiers for effecting adjustments in the rasters scanned thereby, all three tubes may be provided with such differential amplifiers.

BRIEF DESCRIPTION OF THE DRAWINGS

The following detailed description, given by way of example, will best be understood in conjunction with the accompanying drawings in which:

FIG. 1 is a schematic diagram of one embodiment of the present invention;

FIG. 2 is a schematic representation of electrostatic deflection plates with which the present invention can be used.

DETAILED DESCRIPTION OF CERTAIN PREFERRED EMBODIMENTS

Figure 3:
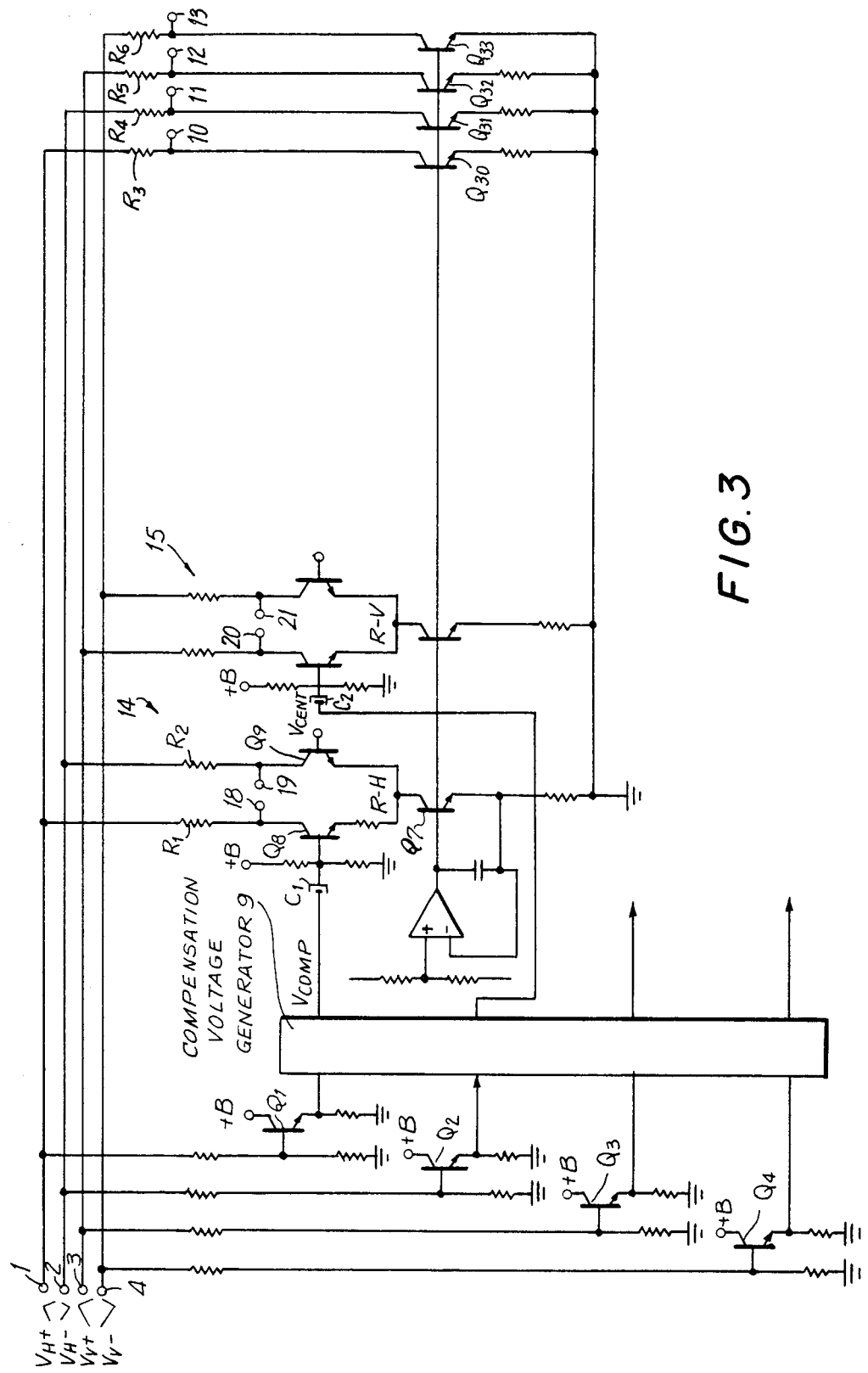
FIG. 3 is a schematic diagram of another embodiment of this invention.

Referring now to the drawings, wherein like reference numerals are used throughout, FIG. 1 is a schematic diagram of one embodiment of the present invention used in a three-tube color television camera. For the purpose of the present discussion, it will be assumed that each tube is provided with horizontal and vertical electrostatic deflection plates. It will be appreciated, from the following description, that each tube may, alternatively, be provided with electromagnetic deflection devices. Although the respective pickup-tubes are not illustrated, it will be appreciated that such tubes are adapted to scan red, green and blue electron beams, respectively, across targets formed of, for example, photoconductive material. The scanning of each beam is controlled by horizontal and vertical deflection plates which, as shown in FIG. 2, are comprised of horizontal deflection plates 5, 6 and vertical deflection plates 7, 8. A suitable source (not shown) generates the appropriate sawtooth-shaped horizontal and vertical voltage waveforms. In FIG. 1, the horizontal sawtooth voltage waveform is represented as differential horizontal deflection voltages $V_{H+}$ and $V_{H-}$. Likewise, the vertical sawtooth deflection voltage waveform is formed of differential vertical deflection voltages $V_{V+}$ and $V_{V-}$. Referring again to FIG. 2, the differential horizontal deflection voltages $V_{H+}$ and $V_{H-}$ are applied across horizontal deflection plates 5, 6. Likewise, the differential vertical deflection voltages $V_{V+}$ and $V_{V-}$ are applied vertical deflection plates 7, 8. It is appreciated that the differential deflection voltages may be considered as complements of each other such that when, for example, the horizontal deflection voltage $V_{H+}$ increases in the positive direction, its differential, or complement, $V_{H-}$ increases in the negative direction. Thus, the voltage differential therebetween is seen to increase, thereby increasing the horizontal deflection of the electron beam. The foregoing also is applicable to the vertical deflection of the electron beam.

FIG. 1 illustrates a compensation voltage generator 9 adapted to generate vertical and horizontal deflection compensating voltages for, for example, the red and blue tubes. In the preferred embodiment, vertical and horizontal deflection compensating voltages are not generated by compensation voltage generator 9 for the green tube. FIG. 1 also is provided with combining circuitry which is adapted to combine the horizontal deflecting signals produced from the source (not shown) and the horizontal deflection compensating voltage for each tube; and also to combine the vertical deflecting signal produced from the source and the vertical deflection compensating voltage for each tube. This combining circuitry is comprised of combining circuits 14, 15, 16 and 17, each of similar construction. More particularly, combining circuit 14 is adapted to combine the horizontal deflecting signals and the horizontal deflection compensating voltage which is generated for the red tube to produce an adjusted horizontal deflecting signal which will be applied to the horizontal deflection plates associated with the red tube. Likewise, combining circuit 15 is adapted to combine the vertical deflecting signals and the vertical deflection compensating voltage generated by compensation voltage generator 9 for the red tube, so as to produce an adjusted vertical deflection signal which is applied to the vertical deflecting plates of the red tube. In similar fashion, combining circuit 16 is adapted to produce an adjusted horizontal deflection signal which is applied to the horizontal deflecting plates of the blue tube; and combining circuit 17 is adapted to produce an adjusted vertical deflection signal which is applied to the vertical deflecting plates of the blue tube. In the illustrated embodiment, the horizontal and vertical deflecting signals which are produced by the source (not shown) are supplied, substantially as is, to the horizontal and vertical deflection plates of the green tube.

Compensation voltage generator 9 is adapted to generate compensating voltages which are selectively adjustable by, for example, the operator of the television camera with which the illustrated apparatus is used. Such compensating voltages are synchronized with the horizontal and vertical deflecting signals and, for this purpose, these deflecting signals are supplied to the compensation voltage generator. In the illustrated embodiment, the differential horizontal deflecting signals $V_{H+}$ and $V_{H-}$ are received at input terminals 1 and 2; and the differential vertical deflecting signals $V_{V+}$ and $V_{V-}$ are received at input terminals 3 and 4. Emitter-follower transistors $Q_1$ and $Q_2$ supply the differential horizontal deflecting signals to compensation voltage generator 9; and emitter-follower transistors $Q_3$ and $Q_4$ supply the differential vertical deflecting signals to the compensation voltage generator. It is appreciated, therefore, that transistors $Q_1$–$Q_4$ are connected to input terminals 1–4, respectively.

Compensation voltage generator 9 is provided with suitable adjusting circuits, such as variable resistors, or the like, adapted to be adjusted by, for example, manual control knobs, or the like. As a result of the horizontal deflecting signals supplied thereto, and in accordance with the adjustments made to the adjusting circuitry included therein, compensation voltage generator 9 generates the aforementioned horizontal and vertical deflection compensating voltages. The compensation voltage generator may be similar to that shown in U.S. Pat. No. 3,463,962. Hence, the magnitude of each of these voltages is adjusted independently by means of the aforementioned adjusting circuitry. For convenience, the compensating voltages generated by compensation voltage generator 9 are referred to herein as the red horizontal compensating voltage, the red vertical compensating voltage, the blue horizontal compensating voltage and the blue vertical compensating voltage, respectively. It will be appreciated that, for example, the red horizontal compensating voltage serves to adjust the horizontal scanning of the red electron beam in the red pickup-tube, and the red vertical compensating voltage serves to adjust the vertical scanning of the red beam. The blue compensating voltages obtain similar adjustments in the vertical scanning of the blue beam. Thus, depending upon the magnitudes of the respective compensating voltages, the raster as scanned by the red and blue beams may be adjusted, as desired. Although not shown herein, compensation voltage generator 9 also may be adapted to generate centering voltages $V_{CENT}$, which, preferably, are DC potentials, adapted to adjust the central position of the raster on the target. Centering voltages are generated for each tube such that red and blue centering voltages are produced. If desired, these centering voltages may be generated by other circuitry (not shown), such as adjustable resistances that are supplied with constant DC potentials. Thus, for purposes of the present discussion, the red and blue deflection compensating voltages are adapted to adjust the size, shape and relative skew of the respective rasters; and the red and blue centering voltages are adapted to adjust the relative positions of the rasters on the respective targets.

Combining circuits 14, 15, 16 and 17 are of similar construction and, in the interest of brevity, only combining circuit 14 will be described in detail. This combining circuit is comprised of a differential amplifier formed of differentially-connected transistors $Q_8$ and $Q_9$ whose emitter electrodes are connected, in common, to a current source comprised of transistor $Q_7$. In the illustrated embodiment, emitter resistors couple each of the respective emitters of transistors $Q_8$ and $Q_9$ to the constant current transistor; but in other embodiments such emitter resistors may be omitted. The collector electrodes of differentially-connected transistors $Q_8$ and $Q_9$ are coupled to a source of operating potential $+B$ via current source transistors $Q_5$ and $Q_6$, respectively. These current source transistors are illustrated as PNP transistors, whereas current source transistor $Q_7$ as well as differentially-connected transistors $Q_8$ and $Q_9$ are illustrated as NPN transistors. A diode-connected transistor $Q_{10}$ has its base-emitter circuit connected in parallel with the respective base-emitter circuits of current source transistors $Q_5$ and $Q_6$. Likewise, a diode-connected transistor $Q_{11}$ has its base connected in common with the base of current source transistor $Q_7$. These respective diode-connected transistors are provided for temperature compensation, as is appreciated by those of ordinary skill in the art.

The base electrodes of differentially-connected transistors $Q_8$ and $Q_9$ are coupled to a pair of inputs to which the red horizontal compensating voltage $V_{COMP}$ is supplied. This horizontal compensating voltage may be supplied differentially across the base electrodes of transistors $Q_8$ and $Q_9$ or, alternatively, the horizontal compensating voltage may be supplied to the base electrode of one of these transistors and a predetermined bias voltage may be supplied to the base electrode of the other. In the embodiment shown in FIG. 1, a capacitor $C_1$ supplies the red horizontal compensating voltage $V_{COMP}$ to the base electrode of transistor $Q_8$. Thus, the compensating voltage which is adapted to adjust the size, skew and rotation of the raster scanned on the target of the red pickup-tube is supplied by capacitor $C_1$ to the base electrode of transistor $Q_8$. Furthermore, in the embodiment shown in FIG. 1, the DC centering voltage $V_{CENT}$ is supplied to the base electrode of transistor $Q_9$. In an alternative embodiment, this centering voltage is supplied differentially across the base electrodes of transistors $Q_8$ and $Q_9$. In a still further embodiment, the centering voltage is supplied to the same base electrode as the compensating voltage $V_{COMP}$ (i.e. to the base electrode of transistor $Q_8$).

The differential amplifier circuit comprising combining circuit 14 is provided with an additional pair of inputs at the collector electrodes of transistors $Q_8$ and $Q_9$, respectively. These inputs are coupled to input terminals 1, 2 via resistors $R_1$ and $R_2$ to receive the horizontal deflecting signals $V_{H+}$ and $V_{H-}$, respectively. A pair of output terminals 18, 19 is coupled to the collector electrodes of transistors $Q_8$ and $Q_9$ and is adapted to be coupled to the horizontal deflection plates 5, 6, respectively, of the red pickup-tube. As will be explained below, output terminals 18, 19 supply adjusted horizontal deflection signals to these deflection plates. The adjustment to these horizontal deflection signals is obtained as a function of the horizontal compensating voltage $V_{COMP}$ and the centering voltage $V_{CENT}$ supplied to the differential amplifier circuit which comprises combining circuit 14.

Combining circuit 15 is of similar construction to combining circuit 14 and, as illustrated, a vertical compensating voltage is supplied to the differential amplifier which comprises this combining circuit from compensation voltage generator 9 via capacitor $C_2$. It also is seen that the vertical deflecting signals $V_{V+}$ and $V_{V-}$ are coupled from input terminals 3, 4 to the respective collector electrodes of the differentially-connected transistors included in this differential amplifier. Output terminals 20, 21 are coupled to the collector electrodes of these differentially-connected transistors; and these output terminals are, in turn, coupled to vertical deflection plates 7, 8 of the red pickup-tube. The vertical deflection signals which are supplied by combining circuit 15 to the vertical deflection plates of the red pickup-tube are adjusted as a function of the compensating and centering voltages that are supplied to the differential amplifier included in this combining circuit.

Combining circuits 16 and 17 are similar to aforementioned combining circuits 14 and 15, and these additional combining circuits are provided with output terminals 22, 23 and 24, 25, respectively. Output terminals 22, 23 of combining circuit 16 are coupled to the horizontal deflection plates provided for the blue pickup-tube; and output terminals 24, 25 of combining circuit 17 are coupled to the vertical deflection plates provided for the blue pickup-tube. It will be appreciated that the horizontal and vertical deflection signals which are supplied to the horizontal and vertical deflection plates, respectively, of the blue pickup-tube are adjusted as a function of the compensating and centering voltages which are applied to combining circuits 16 and 17, respectively.

In the presently described embodiment, it is assumed that the horizontal and vertical deflecting signals supplied to input terminals 1-4 from the deflecting signal source (not shown) are supplied substantially directly to the horizontal and vertical deflection plates of the green pickup-tube. Thus, input terminals 1, 2 are coupled by resistors to output terminals 10, 11, respectively, these output terminals being coupled, in turn, to the horizontal deflection plates included in the green pickup-tube. Likewise, input terminals 3, 4 are coupled via resistors to output terminals 12, 13, respectively; and these output terminals are, in turn, coupled to the vertical deflection plates provided for the green pickup-tube.

The manner in which the embodiment illustrated in FIG. 1 operates now will be described. In the present example, it is assumed that the horizontal and vertical deflecting signals supplied to the horizontal and vertical deflection plates of the green pickup-tube function as "reference" deflecting signals. That is, these deflecting signals are established so as to provide the desired raster scan across the target of the green pickup-tube. For this purpose, the deflecting signal source (not shown) may be provided with suitable adjustment controls so as to generate the desired sawtooth waveform shape for each of the horizontal and vertical deflecting signals. These horizontal and vertical deflecting signals, which may be adjusted by the aforementioned controls provided in the deflecting signal source, are coupled to compensation voltage generator 9 via emitter-follower transistors $Q_1$–$Q_4$, respectively. As illustrated, the "positive" horizontal sawtooth waveform voltage $V_{H+}$ is supplied via emitter-follower transistor $Q_1$ to the compensation voltage generator, and the "negative" horizontal sawtooth waveform voltage $V_{H-}$ supplied thereto via emitter-follower transistor $Q_2$. Similarly, the "positive" vertical sawtooth waveform deflecting voltage $V_{V+}$ is supplied to compensation voltage generator 9 via emitter-follower transistor $Q_3$, and the "negative" vertical sawtooth waveform voltage is supplied thereto via emitter-follower transistor $Q_4$.

The operator of the color television camera with which the present invention is provided operates adjustment mechanisms which, for example, as aforesaid, may comprise adjustable resistors, included in compensation voltage generator 9. Such adjustments serve to produce appropriate red and blue horizontal and vertical deflection compensating voltages. Such compensating voltages thus are derived from the horizontal and vertical deflecting signals which are supplied to the compensation voltage generator. Thus, the deflection compensating voltages are seen to vary during each horizontal and vertical scanning trace in synchronism with the horizontal and vertical deflecting signals.

With reference to combining circuit 14, let it be assumed, initially, that the red horizontal deflection compensating voltage $V_{COMP}$ is equal to zero. Let it be further assumed that current source transistors $Q_5$ and $Q_6$ supply equal constant currents to the collector-emitter circuits of differentially-connected transistors $Q_8$ and $Q_9$, respectively. The sum of these constant currents flows through current source transistor $Q_7$. With the red horizontal deflection compensating voltage equal to zero, the current supplied to the collector of transistor $Q_8$ by current source transistor $Q_5$ is equal to the emitter current of transistor $Q_8$. Likewise, with the red horizontal deflection compensating voltage equal to zero, the current supplied to the collector electrode of transistor $Q_9$ by current source transistor $Q_6$ is equal to the emitter current thereof. Since the collector currents of transistors $Q_8$ and $Q_9$ are determined by current source transistors $Q_5$–$Q_7$ and are equal, it is appreciated that there will be no change in the horizontal deflection current that flows through resistor $R_1$ or through resistor $R_2$. As a consequence thereof, the horizontal deflecting signals $V_{H+}$ and $V_{H-}$ supplied to input terminals 1,2 are equal to the horizontal deflecting signals produced at output terminals 18, 19. That is, the adjustments to such horizontal deflecting signals are equal to zero. Accordingly, the horizontal deflecting signals $V_{H+}$ and $V_{H-}$ which are produced by the deflecting signal source are supplied, without adjustment, to the horizontal deflection plates provided for the red pickup-tube.

Now, let it be assumed that the operator manipulates the adjustment controls provided in compensation voltage generator 9 so as to produce a red horizontal deflection compensation voltage $V_{COMP}$. This adjustment may be performed to correct for size, skew, rotation or other compensation which is needed to return the raster scanned by the red pickup-tube to a proper, predetermined raster. For example, and as mentioned above, in the event of mechanical differences between the deflection plates provided for the red pickup-tube and the deflection plates provided for the green pickup-tube, such adjustments may be desired. That is, the relative position and size of the deflection plates provided with the red tube may differ from those of the deflection plates provided for the green tube. Let it be further assumed that the red horizontal deflection compensating voltage, although variable, is a positive voltage. It is appreciated that the conductivity of transistor $Q_8$ now increases relative to the conductivity of transistor $Q_9$ in accordance with the usual differential operation of a differential amplifier. Although the conductivity of transistor $Q_8$ increases, current source transistor $Q_5$ cannot supply additional current thereto. Because of this, the current flow increases through resistor $R_1$ from input terminal 1 to the collector electrode of transistor $Q_8$. Thus, the current now flowing through transistor $Q_8$, which is equal to the sum of the constant current supplied thereto by current source transistor $Q_5$ and the current now flowing through resistor $R_1$, also flows from the emitter electrode of transistor $Q_8$ to current source transistor $Q_7$. But, the total current supplied to current source transitor $Q_7$ must remain constant. This means that the current supplied to this current source transistor from the emitter electrode of transistor $Q_9$ must decrease by the same amount that the emitter current of transistor $Q_8$ has increased. Since current source transistor $Q_6$ supplies a constant current to the collector electrode of transistor $Q_9$, it is recognized that current must flow from the collector electrode of transistor $Q_9$ through resistor $R_2$ in the opposite direction that current flows through resistor $R_1$. Therefore, in view of the currents which now flow through resistors $R_1$ and $R_2$ so as to increase the collector-emitter current of transistor $Q_8$ and decrease the collector-emitter current of transistor $Q_9$, respectively, the deflecting signals provided at output terminals 18 and 19 are adjusted accordingly. Thus, adjusted horizontal deflection signals are supplied to the horizontal deflection plates of the red pickup-tube from output terminals 18, 19 of combining circuit 14.

A similar compensating operation is carried out by the remaining combining circuits, thereby adjusting the vertical deflection signals supplied to the vertical deflection plates of the red pickup-tube, the horizontal deflection signals supplied to the horizontal deflection plates of the blue pickup-tube and the vertical deflection signals supplied to the vertical deflection plates of the blue pickup-tube. It is, therefore, appreciated that the horizontal and vertical deflection signals supplied to each pickup-tube are adjusted substantially independently of each other; and the horizontal and vertical deflection signals which are supplied to the green pickup-tube may be thought of as reference signals from which adjustments are made. That is, the raster scanned by the red pickup-tube may be adjusted independently of the rasters scanned by the remaining blue and green pickup-tubes. Likewise, the raster scanned by the blue pickup-tube may be adjusted without causing a concurrent, undesired adjustment in the rasters scanned by the red and green pickup-tubes. Of course, if the raster scanned by the green pickup-tube is adjusted, such as by operating the adjustment controls provided in the source of deflecting signals (not shown), any undesired adjustment in the red and blue rasters may be compensated by independent operation of the adjustment controls that are provided for each pickup-tube in compensation voltage generator 9.

Although not specifically described, it should be recognized that a change, or adjustment, in the DC centering voltage $V_{CENT}$ will result in a change in the DC bias of the differential amplifier to which this centering voltage is supplied. This, in turn, adjusts the DC voltages produced at the output terminals of that differential amplifier. Hence, centering adjustments likewise are effected for each pickup-tube substantially independently of the centering adjustments that may be made for the remaining pickup-tubes.

Another embodiment of the present invention is schematically illustrated in FIG. 3. This embodiment differs from that described in detail hereinabove with respect to the particular constructions of the respective combining circuits. For purposes of simplification, only the horizontal and vertical combining circuits 14, 15 for the red pickup-tubes are illustrated.

Combining circuit 14, shown in FIG. 3, differs from combining circuit 14 of FIG. 1 in that constant current transistors $Q_5$ and $Q_6$ are omitted. Rather, input terminals 1, 2 are coupled via reistors $R_1$ and $R_2$ to the collector electrodes of differentially-connected transistors $Q_8$ and $Q_9$, respectively. FIG. 3 also illustrates a bias circuit coupled to the base electrode of transistor $Q_8$ to establish a desired DC bias therefor. Nevertheless, in the embodiment of FIG. 3, it is seen that compensation voltage generator 9 functions to produce independent horizontal and vertical deflection compensating voltages $V_{COMP}$ for each of the red and blue pickup-tubes. The horizontal deflection compensating voltage produced for the red pickup-tube is supplied, via capacitor $C_1$, to the base of transistor $Q_8$ and is seen to be similar, in this regard, to that described above. Likewise, the DC centering voltage $V_{CENT}$ is supplied to the base of transistor $Q_9$.

In operation, current flows through resistors $R_1$ and $R_2$ from input terminals 1, 2 in response to the horizontal deflecting signals. The sum of these currents is equal to the current determined by constant current transistor $Q_7$. Since current flows through resistors $R_1$ and $R_2$, it is appreciated that the horizontal deflection signals produced at output terminals 18, 19 are offset with respect to the horizontal deflecting signals $V_{H+}$ and $V_{H-}$ supplied to input terminals 1, 2 because of the voltage drops across resistors $R_1$ and $R_2$, respectively. To account for a similar offset in, for example, the green pickup-tube, resistors $R_3$ and $R_4$ are coupled from input terminals 1, 2 to constant current transistors $Q_{30}$ and $Q_{31}$, respectively. Thus, in the absence of a deflection compensating voltage, the voltage drops across resistors $R_1$, $R_2$, $R_3$ and $R_4$ are equal so as to produce equal horizontal deflection signals at output terminals 18, 19 and 10, 11, respectively. Now, however, if an adjustment is to be made in, for example, the horizontal scanning in the red pickup-tube, a horizontal deflection compensating voltage $V_{COMP}$ is supplied from compensation voltage generator 9 to the base electrode of transistor $Q_8$. This compensation voltage changes the conductivity of transistor $Q_8$ so as to adjust the collector-emitter current flowing therethrough. A complementary adjustment is made in the collector-emitter current flowing through transistor $Q_9$. For example, if the current flowing through resistor $R_1$ increases, a corresponding decrease is effected in the current flowing through resistor $R_2$. Hence, the deflection voltage produced at output terminal 18 may decrease, and the deflection voltage provided at output terminal 19 may increase by the same amount. This results in an adjustment in the horizontal deflection signal which is supplied from output terminals 18, 19 to the horizontal deflection plates provided for the red pickup-tube.

It will be appreciated that combining circuit 15 operates in a similar manner to attain adjustments in the vertical deflection signals supplied to the vertical deflection plates of the red pickup tube. Likewise, although not shown in FIG. 3, the horizontal and vertical deflection signals which are supplied to the horizontal and vertical deflection plates of the blue pickup-tube are similarly adjusted in response to deflection compensating voltages produced by compensation voltage generator 9. Furthermore, the DC bias supplied to each differential amplifier also may be adjusted by adjusting the centering voltage $V_{CENT}$ supplied thereto.

In the embodiment of FIG. 3, it is seen that the number of circuit elements required and, thus, the complexity of each of the combining circuits is reduced relative to the combining circuits shown in FIG. 1. However, since the embodiment of FIG. 1 is provided with current source transistors coupled to the collector electrodes of the differentially-connected transistors, this embodiment exhibits a larger gain than that of the FIG. 3 embodiment.

While the present invention has been particularly shown and described with reference to certain preferred embodiments, it should be readily appreciated to those of ordinary skill in the art that various changes and modifications in form and details may be made without departing from the spirit and scope of the invention. For example, each differential amplifier may be comprised of various stages, one or more of which may be formed of Darlington-connected transistors. Furthermore, the respective transistors may be formed of bipolar transistors, field effect transistors, or the like. Still further, each of the illustrated circuits may be comprised of operational amplifiers, integrated circuits, and other conventional circuit devices normally used for applications of the type described herein. Still further, the raster scanned by the green pickup-tube may be considered to be a "reference" raster in that the horizontal and vertical deflecting signals which are generated by the deflecting signal source are supplied substantially directly to the deflection plates of the green pickup-tube. This is preferred because the green video information produced by the green pickup-tube is known to provide more video information than either the red or blue video signals. If desired, the red or blue rasters may be selected as the "reference"; and separate horizontal and vertical combining circuits may be provided for the green pickup-tube. Still further, although the preferred embodiment has been described in conjunction with electrostatic deflection plates, it will be appreciated that, if desired, other conventional deflecting devices may be used. It is, therefore, intended that the appended claims be interpreted as including the foregoing as well as other changes and modifications.

What is claimed is:

1. Apparatus for supplying deflection control signals to respective horizontal and vertical deflecting means in a plural pick-up tube television camera, comprising a source of horizontal and vertical deflecting signals; means for supplying said horizontal and vertical deflection signals directly to the respective horizontal and vertical deflecting means of a predetermined single pickup-tube of said plural pick-up tube television camera; compensating voltage generating means connected to receive said horizontal and vertical deflecting signals and selectively operative to produce therefrom respective deflection compensating voltage that vary during each horizontal and vertical scanning trace in synchronism with said respective horizontal and vertical deflecting signals for selected ones of the remaining pick-up tubes of said camera other than said predetermined single pick-up tube; and differential amplifier means connected to receive said horizontal and vertical deflecting signals and corresponding deflection compensating voltages for selectively superimposing said respective deflection compensating voltages onto corresponding ones of said horizontal and vertical deflecting signals to generate adjusted horizontal and vertical deflection signals for application to the horizontal and vertical deflecting means of said selected ones of said remaining pick-up tubes other than said predetermined single pick-up tube, whereby the deflections of said pick-up tubes are adjusted independently of one another.

2. The apparatus of claim 1 wherein said television camera is a color television camera, and said pickup-tubes comprise red, green and blue color pickup-tubes for generating red, green and blue color video signals, respectively.

3. The apparatus of claim 2 wherein said predetermined pickup-tube is the green color pickup-tube and said selected pickup-tubes are the red and blue color pickup-tubes.

4. The apparatus of claim 1 wherein each said pickup-tube generates an electron beam for scanning a raster across a target under control of the respective horizontal and vertical deflecting means of said pickup-tube; and said compensating voltage generating means includes adjustment means to produce said deflection compensating voltages to compensate for predetermined deviations between the rasters scanned by said respective pickup-tubes, including deviations in size, position and orientation thereof.

5. The apparatus of claim 1 wherein said horizontal and vertical deflecting means of each pickup-tube comprises horizontal electrostatic deflection plates and vertical electrostatic deflection plates, respectively.

6. The apparatus of claim 5 wherein each said pickup-tube generates an electron beam for scanning a raster across a target under control of the respective horizontal and vertical electrostatic deflection plates of said pickup-tube; and said compensating voltage generating means includes adjustment means to produce said deflection compensating voltages to compensate for mechanical differences between the electrostatic deflection plates of said respective pickup-tubes.

7. The apparatus of claim 6 wherein said mechanical differences comprise differences in the size of the respective electrostatic deflection plates from one pickup-tube to the next.

8. The apparatus of claim 6 wherein said mechanical differences comprise differences in the relative positioning of the respective electrostatic deflection plates in said pickup-tubes.

9. The apparatus of claim 1 wherein said combining means comprises respective horizontal and vertical combining means for each of said selected pickup-tubes, each said horizontal combining means being operative to combine said horizontal deflecting signal and the horizontal deflection compensating voltage produced for that pickup-tube to generate the adjusted horizontal deflection signal for application to that pickup-tube, and each said vertical combining means being operative to combine said vertical deflecting signal and the vertical deflection compensating voltage produced for that pickup-tube to generate the adjusted vertical deflection signal for application to that pickup-tube.

10. The apparatus of claim 9 wherein each of said horizontal and vertical differential amplifier means include first input means connected to receive said deflecting signals and second input means connected to receive said deflection compensating voltages, whereby said deflecting signals are adjusted as a function of said deflection compensating voltages.

11. The apparatus of claim 10 wherein each differential amplifier means is comprised of a pair of differentially-connected transistor means having base electrodes connected to receive said deflection compensating voltages thereacross, collector electrodes connected to receive said deflecting signals and emitter electrodes connected in common to a current source; and wherein said adjusted deflection signals are generated at said collector electrodes.

12. The apparatus of claim 11 wherein said source of horizontal and vertical deflecting signals comprises supply means for supplying a pair of differential horizontal deflecting signals and a pair of differential vertical deflecting signals; and wherein each differential amplifier means further includes a pair of resistance means coupled to the respective collector electrodes of said pair of differentially-connected transistor means to supply said pair of differential deflecting signals thereto.

13. The apparatus of claim 12 wherein said means for supplying said horizontal and vertical deflection signals to the respective horizontal and vertical deflecting means of a predetermined pickup-tube comprises a pair of horizontal resistive supply means for supplying said pair of differential horizontal deflecting signals to the horizontal deflecting means of said predetermined pickup-tube and a pair of vertical resistive supply means for supplying said pair of differential vertical deflecting signals to the vertical deflecting means thereof.

14. The apparatus of claim 13 wherein said means for supplying said horizontal and vertical deflection signals to the respective horizontal and vertical deflecting means of said predetermined pickup-tube further comprises additional current source means coupled to said pair of horizontal resistive supply means and to said pair of vertical resistive supply means to cause the currents through said pair of horizontal resistive supply means to be substantially equal to the currents through said pair of resistance means coupled to the respective collector electrodes of said pair of differentially-connected transistor means comprising the horizontal combining means for each of said selected pickup-tubes in the absence of horizontal deflection compensating voltages, and to cause the currents through said pair of vertical resistive supply means to be substantially equal to the currents through said pair of resistance means coupled to the respective collector electrodes of said pair of differentially-connected transistor means comprising the vertical combining means for each of said selected pickup-tubes in the absence of vertical deflection compensating voltages.

15. The apparatus of claim 13 wherein each differential amplifier is further comprised of a pair of additional current source means coupled to respective ones of the collector-emitter circuits of said pair of differentially-connected transistor means.

16. The apparatus of claim 15 wherein, in each differential amplifier, the current through said current source connected to the emitter electrodes of said differentially-connected transistor means is equal to the sum of the currents through said additional current source means.

17. Apparatus for supplying deflection control signals to the horizontal and vertical deflection plates, respectively, of the red, green and blue pickup-tubes of a color television camera, comprising a source of horizontal and vertical deflecting signals; means for supplying said horizontal and vertical deflecting signals directly to the horizontal and vertical deflection plates, respectively, of a predetermined one of said red, green, and blue pick-up tubes; compensating voltage generating means connected to receive said horizontal and vertical deflecting signals and being selectively operable to produce therefrom horizontal and vertical compensating voltages that vary during each horizontal and vertical scanning trace in synchronism with said respective horizontal and vertical deflecting signals for each of the remaining pickup-tubes of said camera; a respective horizontal differential amplifier means for each of the two remaining pickup-tubes; a respective vertical differential amplifier means for each of the two remaining pickup-tubes; means for supplying said horizontal deflecting signals to said respective horizontal differential amplifier means; means for supplying said vertical deflecting signals to said respective vertical differential amplifier means; said horizontal differential amplifier means being connected to receive respective ones of the produced horizontal compensating voltages for superimposing same on respective horizontal deflecting signals to supply adjusted horizontal deflection signals to the horizontal deflection plates of corresponding ones of the two remaining pickup-tubes; and said vertical differential amplifier means being connected to receive respective ones of the produced vertical compensating voltages for superimposing same on respective vertical deflecting signals to supply adjusted vertical deflection signals to the vertical deflection plates of corresponding ones of the two remaining pickup-tubes, whereby the deflections of said pickup-tubes are individually adjusted independently.

18. The apparatus of claim 17 wherein said predetermined one pickup-tube is the green pickup-tube; wherein said compensating voltage generating means generates selective red and blue horizontal compensating voltages and selective red and blue vertical compensating voltages; wherein said horizontal differential amplifier means comprise red and blue horizontal differential amplifiers supplied with said horizontal deflecting signals and connected to receive said red and blue horizontal compensating voltages to supply adjusted red and blue horizontal deflection signals to the horizontal deflection plates of said red and blue pickup-tubes, respectively; and wherein said vertical differential amplifier means comprise red and blue vertical differential amplifiers supplied with said vertical deflecting signals and connected to receive said red and blue vertical compensating voltages to supply adjusted red and blue vertical deflection signals to the vertical deflection plates of said red and blue pickup-tubes, respectively.

19. The apparatus of claim 18 wherein said horizontal deflecting signals comprise a pair of differential signals and said vertical deflecting signals comprise a pair of differential signals; and wherein each differential amplifier includes a pair of differentially-connected transistor means having common-connected emitter electrodes, at least one base electrode connected to receive a respective compensating voltage, and a pair of collector electrodes supplied with a respective pair of said differential signals.

20. The apparatus of claim 19 wherein each differential amplifier further includes current source means coupled to said common-connected emitter electrodes.

21. The apparatus of claim 20 wherein each differential amplifier additionally includes a pair of current sources connected to the collector electrodes in series with the collector-emitter circuits of said pair of differentially-connected transistor means, respectively, said pair of current sources supplying substantially equal currents; and wherein said means for supplying horizontal and vertical deflecting signals to said horizontal and vertical differntial amplifier means each comprises a pair of resistor means coupled to the collector electrodes of said pair of differentially-connected transistor means, respectively.

22. The apparatus of claim 20 wherein the sum of the currents supplied by said pair of current sources is substantially equal to the current supplied by said current source means.

23. The apparatus of claim 20 wherein said means for supplying horizontal and vertical deflecting signals to said horizontal and vertical differential amplifier means each comprises a pair of resistor means connected to the collector electrodes in series with the collector-emitter circuits of said pair of differentially-connected transistor means, respectively.

24. The apparatus of claim 20 further comprising means for supplying a varying compensating voltage to the base electrode of one of said differentially-connected transistor means; and means for supplying a DC compensating voltage to the base electrode of the other of said differential-connected transistor means.

25. The apparatus of claim 20 wherein the adjusted deflection signals supplied by each said differential amplifier are produced at the collector electrodes of said pair of differentially-connected transistor means, respectively.

* * * * *